United States Patent Office 3,302,613
Patented Feb. 7, 1967

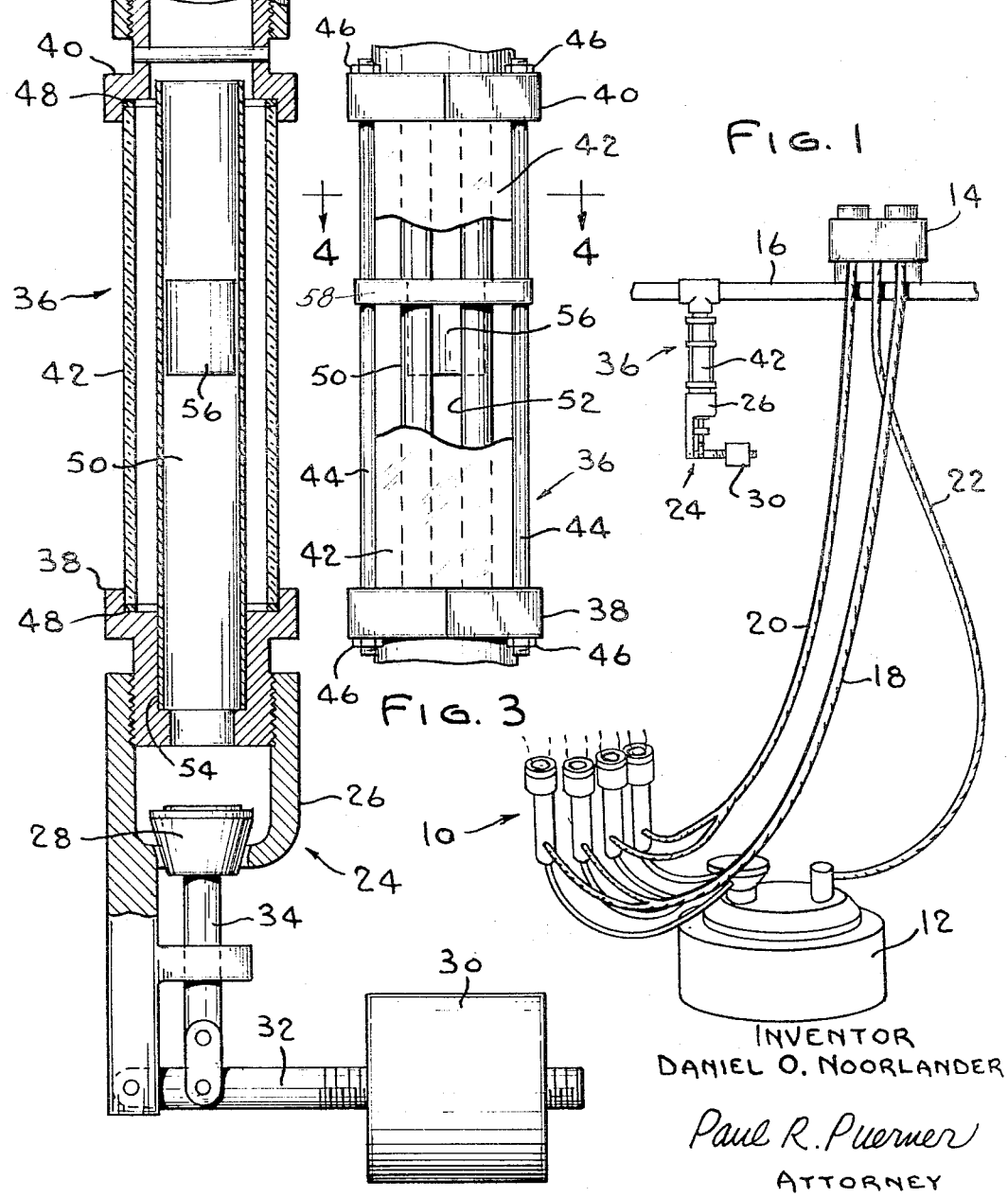

3,302,613
AIR RESERVE INDICATOR FOR MILKING SYSTEMS
Daniel O. Noorlander, Madison, Wis., assignor to Dairy Equipment Company, Madison, Wis., a corporation of Wisconsin
Filed Feb. 5, 1965, Ser. No. 430,639
6 Claims. (Cl. 119—14.14)

This invention relates to an improved milking system wherein losses in "air reserve" can be readily detected and to a novel "air reserve" indicator means for use in the improved system.

In a conventional milking system, a vacuum controller is provided to maintain the system vacuum at a predetermined value. The vacuum controller is designed to control vacuum by automatically metering air from atmosphere into the system.

It is important in the proper operation of the milking system that the "air reserve" or air flow through the controller be maintained above a given level. Operation under conditions of low air reserve results in inefficient milking which can cause mastitis in the cow. A reduction of air reserve is not evidenced by loss of vacuum in the system until conditions reach a point at which all vacuum is lost and thus a simple vacuum guage cannot be relied on as an indicator of a dangerously low air reserve condition. In other words, loss in milking efficiency can occur under conditions of low air reserve before a noticeable loss in vacuum occurs.

The purpose of this invention, therefore, is to provide an improved system where losses of air reserve can be readily detected so that corrective measures can be taken before serious problems arise.

A further object is to provide an improved air flow indicator particularly designed for use in a milking system.

Other objects and advantages will be pointed out in, or be apparent from, the description and claims, as will obvious modifications of the single embodiment shown in the drawings, in which:

FIG. 1 is a fragmentary perspective view of an improved milking apparatus incorporating the present invention;

FIG. 2 is a side elevation view (with parts broken away) of the air flow indicating device (and vacuum controller) employed in the milking system of this invention;

FIG. 3 is a side elevation view of the air flow indicating device of this invention; and FIG. 4 is a horizontal sectional view taken along line 4—4 of FIG. 3.

Referring to the drawings in detail, FIG. 1 shows a bucket-type milking system wherein the teat cups 10 are shown connected to a cow to deliver milk to a bucket 12 in the usual manner. The cups are under control of a pulsator 14 mounted on a vacuum line 16 and connected to the cups 10 through vacuum lines 18 and 20. A third vacuum line 22 is connected to bucket 12 as shown. While the present invention is shown and described with reference to a bucket-type milking system, it should be understood that this invention could be used with other types of systems such as the so-called "pipe-line" system wherein the milk from the teat cups is discharged into a milk line as opposed to a bucket.

In conventional milking systems a vacuum controller 24 (like that shown in FIG. 2) is connected directly to vacuum line 16. Controller 24 is comprised of a housing 26 and a movable valve member 28 which is biased to its normally closed position by a weight 30 threaded on a rod 32. Weight 30 is operatively connected to the valve member by means of pivotally mounted rod 32 and a link 34. As vacuum in line 16 builds up, valve 28 will open at a predetermined pressure (determined by the position of weight 30 on rod 32) and air from atmosphere will flow into the system past valve member 28 to maintain the system vacuum at the desired level.

It is important to the proper operation of the milking system that the air flow through controller 24 ("air reserve") be maintained above a given level. Operation under conditions of low "air reserve" results in inefficient milking which in turn can cause mastitis in the cow. A reduction in air flow (air reserve) is not evidenced by a loss of vacuum in the system until conditions reach a point at which all vacuum is lost and thus a simple guage in the system cannot be relied on as an indicator of a dangerously low "air reserve" condition.

The purpose of this invention, therefore, is to provide an improved system wherein losses of "air reserve" can be readily detected so that corrective measures can be taken before serious losses in milking efficiency and/or injury to the cow occur.

This is accomplished by the introduction of a specially designed air flow indicator means 36 into the system. Preferably, indicator means 36 is connected to the downstream side of controller 24, i.e., between the controller 24 and the vacuum line 16.

Indicator means 36 is comprised of bottom and top end fittings 38 and 40 between which is clamped a transparent tubular member 42 by means of three tie rods 44 which extend through aligned holes in end fittings 38 and 40 and are secured in place by nuts 46. Gaskets 48 are provided to seal member 42 to end fittings 38 and 40.

A tube 50 having a longitudinally extending slot 52 therein is mounted inside member 42 with its lower end snugly seated in the inner bore 54 of fitting 38 so that air passed by controller 24 will be forced to flow into the lower end of tube 50. A flow indicating valve member 56 is slidably mounted inside tube 50 and will be raised in the tube to a predetermined height depending upon the volume of air flow into the tube.

It will be appreciated that as flow increases the level of member 56 in tube 50 will increase which in turn will increase the size of the effective flow passageway through the indicator until a point of equilibrium is reached. At such equilibrium point valve member 56 will tend to "float" in tube 50 at a given level as long as air flow remains constant. The parts of indicator 36 are calibrated so that at the desired amount of air flow (for the particular installation involved), valve member 56 will assume a position such as that shown in the drawings.

This "proper operating position" is then marked by an adjustable marker member 58 which can be set at the level of the valve member 56 in tube 50. Marker 58 can be of any suitable design such as that shown in the drawings wherein it is in the form of a metal clip having curled ends 60 which snap around tie rods 44, as shown in FIG. 4.

With the marker 58 set at the proper operating level any loss of air reserve which may occur as a consequence of plugged or partially plugged lines, air leaks in the system, a worn vacuum pump, etc. will be reflected by a drop in the level of indicator member 56 in tube 50. When this occurs the operator can take proper corrective measures before serious losses in milking efficiency and damage to the cow results.

Although but one embodiment of the present invention has been illustrated and described, it will be apparent to those skilled in the art that various changes and modifications may be made therein without departing from the spirit of the invention or from the scope of the appended claims.

I claim:
1. A milking system having a set of teat cups operat- ing under the control of a pulsator connected to a vacuum line comprising:
- a vacuum controller means communicating with the vacuum line and operative to control the amount of vacuum in the milking system, said vacuum controller means including a reciprocating plug type valve member pivotally connected at its end to a cantilevered adjustable weight means; and
- an air reserve indicating means connected between said vacuum controller means and the vacuum line, said air reserve indicating means operative to indicate a drop in air flow through said vacuum controller below a predetermined level, said air reserve indicating means further including a tube member having a longitudinally extending opening means in the wall thereof and having an air flow sensing indicator member slidably mounted in said tube member.

2. A milking system according to claim 1 in which said air reserve indicating means includes a housing means for directing air flow into the bottom of said tube and out that portion of said opening means located beneath the level of said indicator member.

3. A milking system according to claim 1 in which there is an adjustable marker member mounted on said housing means to facilitate detection of a drop in the level of said indicator member in said tube below a predetermined level.

4. A milking system according to claim 3 in which said housing means includes a pair of end fittings and a transparent tube clamped therebetween.

5. A milking system according to claim 4 in which said housing means further includes a plurality of tie rods to clamp said transparent tube between said end fittings, two of said rods serving to slidably support said adjustable marker member thereon.

6. A milking system having a set of teat cups operating under the control of a pulsator connected to a vacuum line comprising:
- a vacuum controller means communicating with the vacuum line and operative to control the amount of vacuum in the milking system, said vacuum controller means including a reciprocating plug type valve member operatively connected at its end to an adjustable weight means; and
- an air reserve indicating means connected between said vacuum controller means and the vacuum line, said air reserve indicating means operative to indicate a drop in air flow through said vacuum controller below a predetermined level, said air reserve indicating means further including a tube member having a longitudinally extending opening in the wall thereof and having an air flow sensing indicator member slidably mounted in said tube member.

References Cited by the Examiner

UNITED STATES PATENTS

| | | | |
|---|---|---|---|
| 1,303,073 | 5/1919 | Lambert | 73—208 |
| 1,805,423 | 5/1931 | Staley | 137—532 X |
| 2,244,382 | 6/1941 | Atchinson | 137—532 X |
| 2,676,560 | 4/1954 | Thomas | 119—14.14 X |
| 2,970,561 | 2/1961 | Ashwood | 116—117 |
| 3,008,330 | 11/1961 | Seemar | 73—208 |
| 3,078,870 | 2/1963 | Merritt et al. | 137—534 |

SAMUEL KOREN, *Primary Examiner.*

ALDRICH F. MEDBERY, *Examiner.*